United States Patent
Nakagawa

(10) Patent No.: US 11,897,368 B2
(45) Date of Patent: Feb. 13, 2024

(54) FLOOR LOCK RELEASE MECHANISM

(71) Applicant: TOYOTA BOSHOKU KABUSHIKI KAISHA, Aichi-ken (JP)

(72) Inventor: Hiroki Nakagawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 388 days.

(21) Appl. No.: 17/329,988

(22) Filed: May 25, 2021

(65) Prior Publication Data

US 2021/0370800 A1 Dec. 2, 2021

(30) Foreign Application Priority Data

May 29, 2020 (JP) ................................ 2020-094711

(51) Int. Cl.
*B60N 2/015* (2006.01)
*B60N 2/90* (2018.01)

(52) U.S. Cl.
CPC ........... *B60N 2/0155* (2013.01); *B60N 2/933* (2018.02)

(58) Field of Classification Search
CPC . B60N 2/0155; B60N 2/933; B60N 2002/948
USPC .......................................................... 296/63
See application file for complete search history.

(56) References Cited

U.S. PATENT DOCUMENTS

| | | | | |
|---|---|---|---|---|
| 2003/0127898 A1* | 7/2003 | Niimi | ..................... | B60N 2/206 297/378.12 |
| 2010/0026069 A1* | 2/2010 | Bruck | ................... | B60N 2/2352 296/65.09 |
| 2011/0049925 A1* | 3/2011 | Champ | .............. | B60N 2/01583 296/65.09 |
| 2011/0049953 A1* | 3/2011 | Champ | ................ | B60N 2/3011 296/65.09 |
| 2014/0183920 A1* | 7/2014 | Hage-Hassan | ........... | B60N 2/36 297/378.1 |

(Continued)

FOREIGN PATENT DOCUMENTS

| | | | | | |
|---|---|---|---|---|---|
| FR | 2833897 A1 | * | 6/2003 | ............. | B60N 2/206 |
| FR | 3039470 A1 | * | 2/2017 | ......... | B60N 2/01583 |
| JP | H0644449 U | * | 6/1994 | | |

(Continued)

OTHER PUBLICATIONS

Machine translation of Notice of Reasons for Refusal Application No. JP 2020-094711 (5 pages) (Year: 2023).*

*Primary Examiner* — Hilary L Gutman
(74) *Attorney, Agent, or Firm* — Greenblum & Bernstein, P.L.C.

(57) ABSTRACT

A floor lock release mechanism includes an arm member, a lever, a switching member, a lever biasing member, and a switching member biasing member. The lever is rotatable between a rearward rotational position and a forward rotational position. The lever biasing member biases the lever toward a neutral position. The switching member is rotatable between a locked position and an unlocked position. The switching member biasing member biases the switching member toward the locked position. The lever includes a pressed portion and a pressing portion. The pressing portion is arranged on the same side as a side on which the pressed portion is arranged with respect to a straight line orthogonal to a straight line connecting the pressed portion and a rotation center.

6 Claims, 16 Drawing Sheets

(56) References Cited

U.S. PATENT DOCUMENTS

2015/0108808 A1* 4/2015 Schukalski .............. B60N 2/22
  297/341
2021/0370800 A1* 12/2021 Nakagawa ........... B60N 2/0155

FOREIGN PATENT DOCUMENTS

| JP | 2002-067761 A | 3/2002 | | |
|----|---------------|--------|---|---|
| JP | 2018-030547 A | 3/2018 | | |
| WO | WO-2009119586 A1 * | 10/2009 | ......... | B60N 2/01583 |

* cited by examiner

FLOOR LOCK RELEASE MECHANISM

This nonprovisional application is based on Japanese Patent Application No. 2020-094711 filed on May 29, 2020 with the Japan Patent Office, the entire contents of which are hereby incorporated by reference.

BACKGROUND

Field

The present disclosure relates to a floor lock release mechanism.

Description of the Background Art

A floor lock release mechanism that can release a floor lock that locks a movement of a seat with respect to a vehicle floor has been conventionally known. For example, Japanese Patent Laying-Open No. 2002-67761 discloses a seat apparatus including a seat lock that performs engagement and disengagement between a seat and a vehicle floor, and a reclining device that allows adjustment of a tilt of a seat back of the seat.

In the above-described apparatus, when the seat back tilts forward, a contact portion formed at a lower end of an arm bracket fixed to the reclining device pushes rearward a first pin provided at one end of a lever, and the lever is thereby rotated. As a result, a second pin provided at the other end of the lever drives a link of a lock actuating device, and thus, a floor lock is released.

When the seat back reaches a folded position, the contact portion of the arm bracket is separated from the first pin of the lever, and thus, the lever returns to a neutral position due to pulling force of a spring. At this time, the driving of the link by the second pin is released, and thus, the floor lock is locked.

When the seat back tilts rearward from the above-described state, the contact portion of the arm bracket pushes forward the first pin of the lever, and the lever is thereby rotated in a direction opposite to the above-described direction. At this time, the second pin moves in a long hole provided in the link, and thus, the second pin does not drive the link. Therefore, the floor lock is maintained in the locked state.

The seat apparatus described in Japanese Patent Laying-Open No. 2002-67761 has room for reduction in size of the arm bracket and the lever.

An object of the present disclosure is to provide a floor lock release mechanism that can achieve a reduction in size of an arm member and a lever.

SUMMARY

A floor lock release mechanism according to one aspect of the present disclosure is a floor lock release mechanism that can release a floor lock that locks a movement of a seat with respect to a floor of a vehicle, the seat including a seat cushion and a seat back, the floor lock release mechanism including: an arm member that rotates relative to a cushion side frame in the same direction as a direction of rotation of a back side frame with respect to the cushion side frame when the back side frame tilts with respect to the cushion side frame, the cushion side frame constituting a part of a framework of the seat cushion, the back side frame constituting a part of a framework of the seat back; a lever connected to the cushion side frame so as to rotate relative to the cushion side frame by being pushed by the arm member when the arm member rotates with respect to the cushion side frame; a switching member connected to the cushion side frame so as to rotate relative to the cushion side frame by being pushed by the lever when the lever rotates with respect to the cushion side frame, and being capable of switching the floor lock between a locked state and an unlocked state, the locked state being a state in which the floor lock locks the movement of the seat with respect to the floor, the unlocked state being a state in which the floor lock permits the movement of the seat with respect to the floor; a lever biasing member that biases the lever; and a switching member biasing member that biases the switching member, wherein the lever is rotatable between a rearward rotational position and a forward rotational position, the rearward rotational position being a position in which the lever is rotated in a rearward rotational direction opposite to a forward rotational direction in which the arm member rotates when the back side frame tilts forward with respect to the cushion side frame from a neutral position in which no external force from the arm member acts on the lever, the forward rotational position being a position in which the lever is rotated in the forward rotational direction from the neutral position, the lever biasing member biases the lever toward the neutral position, the switching member is rotatable between a locked position and an unlocked position, the locked position being a position in which the floor lock is maintained in the locked state, the unlocked position being a position in which the switching member is in contact with the lever located in the rearward rotational position and the floor lock is maintained in the unlocked state, the switching member biasing member biases the switching member toward the locked position, the lever pushes the switching member toward the unlocked position while rotating toward the rearward rotational position by being pushed by the arm member that rotates in the forward rotational direction, and rotates toward the forward rotational position while being separated from the switching member by being pushed by the arm member that rotates in the rearward rotational direction, the lever includes: a pressed portion that is pressed by the arm member; and a pressing portion that presses the switching member, and the pressing portion is arranged on the same side as a side on which the pressed portion is arranged with respect to a straight line orthogonal to a straight line connecting the pressed portion and a rotation center of the lever.

According to the present disclosure, there can be provided a floor lock release mechanism that can achieve a reduction in size of an arm member and a lever.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
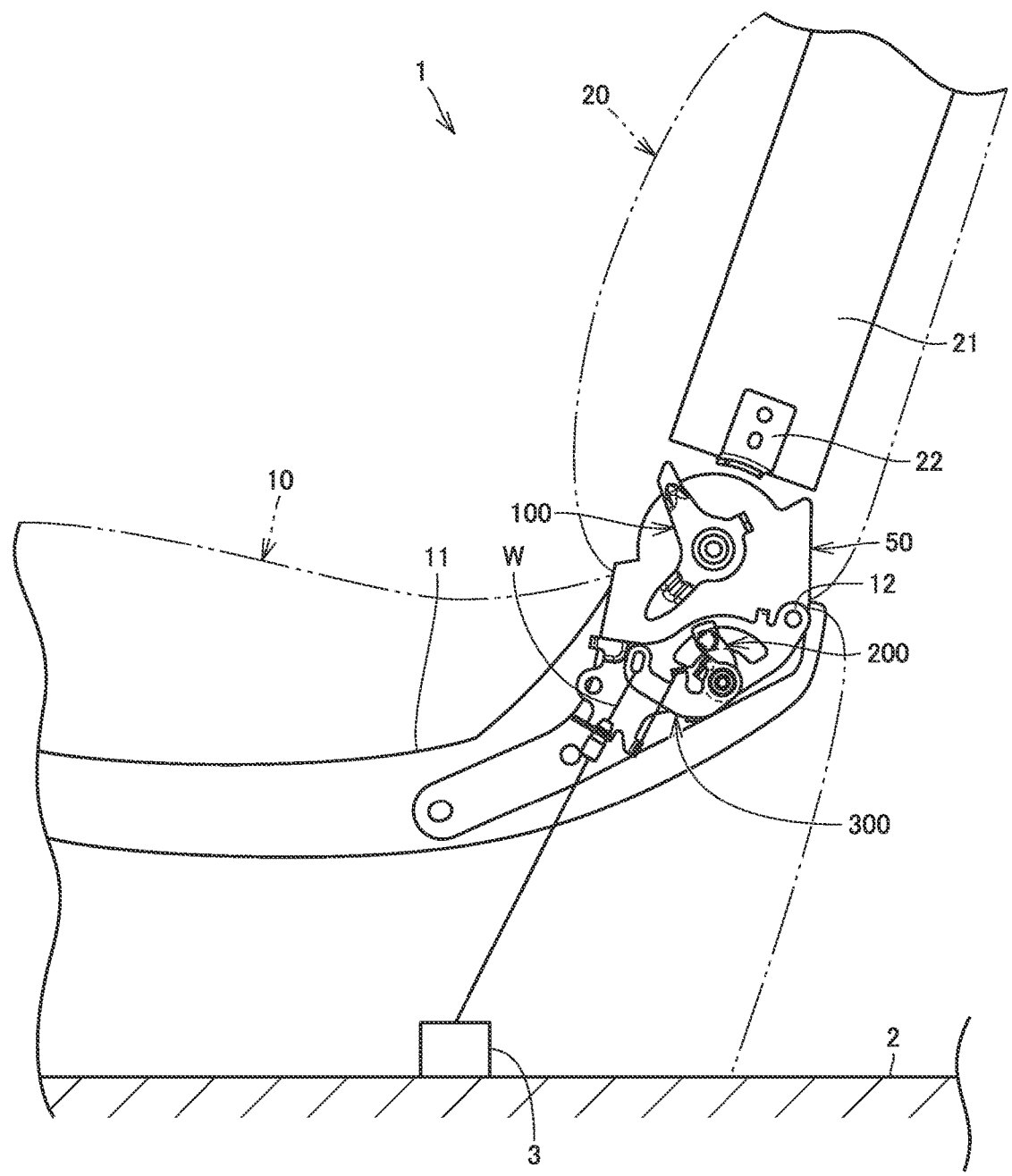
FIG. 1 is a side view of a floor lock release mechanism according to a first embodiment of the present disclosure and a seat.

Embodiments of the present disclosure will be described with reference to the drawings. In the drawings referenced below, the same or corresponding components are denoted by the same reference numerals.

First Embodiment

FIG. 1 is a side view of a floor lock release mechanism according to a first embodiment of the present disclosure and a seat. A seat 1 includes a seat cushion 10 and a seat back 20.

Seat cushion 10 constitutes a seat portion. Seat cushion 10 includes a cushion side frame 11 that constitutes a framework of seat cushion 10.

Seat back 20 supports the back of an occupant seated on seat cushion 10. Seat back 20 includes a back side frame 21 that constitutes a framework of seat back 20. Back side frame 21 can tilt with respect to cushion side frame 11, with a lower end thereof being a tilt center. The tilting of back side frame 21 with respect to cushion side frame 11 can be achieved by a recliner 4 (see FIG. 3) provided between cushion side frame 11 and back side frame 21.

Seat 1 is configured to be movable with respect to a floor 2 of a vehicle. The above-described movement includes, for example, sliding seat 1 with respect to floor 2 in a front-back direction and the like of a vehicle, and pivoting seat 1 about a front end of seat cushion 10 such that a rear end of seat cushion 10 jumps up in a state where seat back 20 is folded.

Seat 1 is provided with a floor lock 3. Floor lock 3 is a mechanism that locks the movement of seat 1 with respect to floor 2. When a wire W that constitutes a part of floor lock 3 is pulled, floor lock 3 enters an unlocked state in which locking is released, and thus, the movement of seat 1 with respect to floor 2 is permitted. When wire W is not pulled, floor lock 3 is maintained in a locked state in which the movement of seat 1 with respect to floor 2 is locked.

Figure 2:
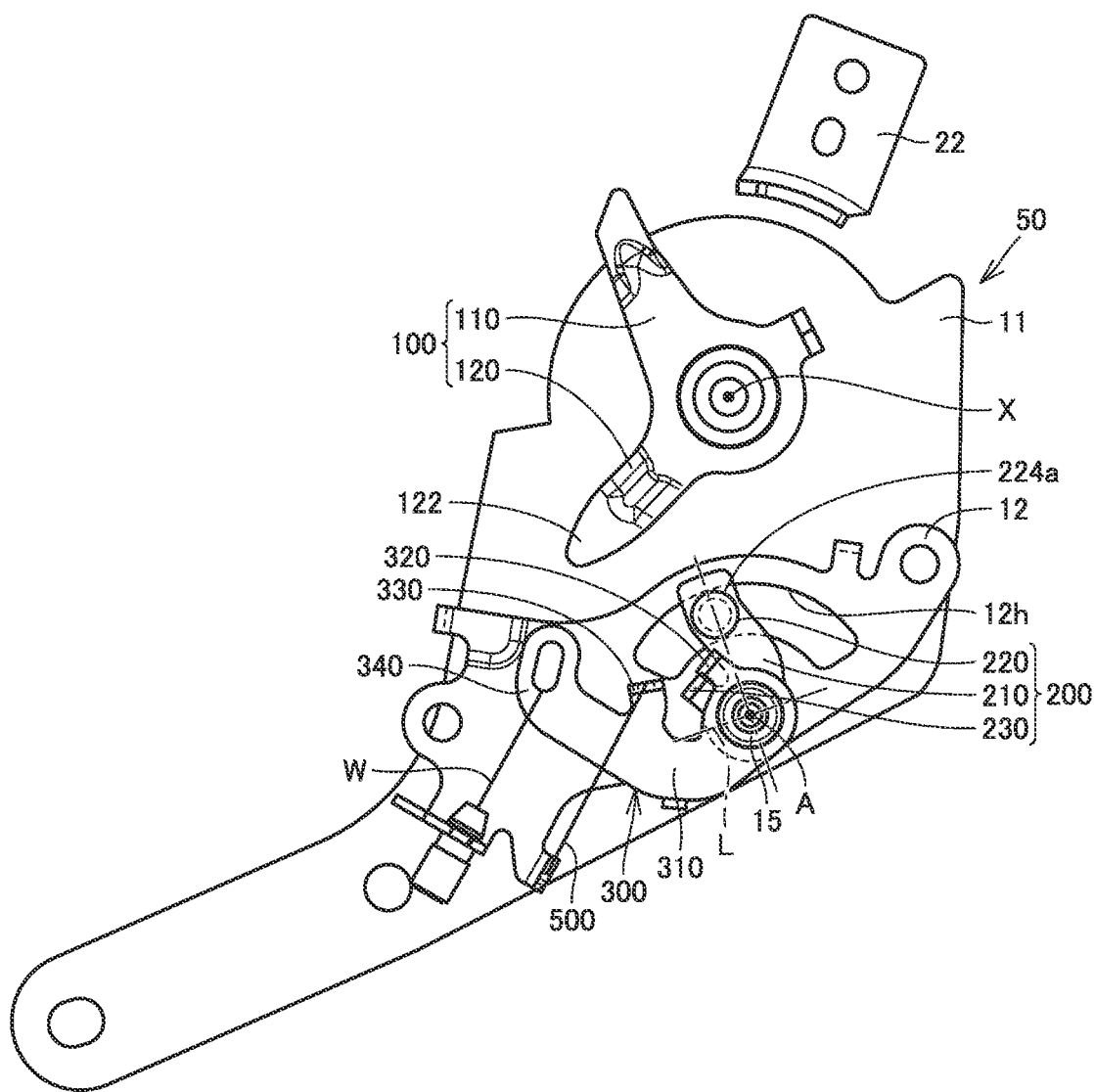
FIG. 2 is a front view of the floor lock release mechanism.
Figure 3:
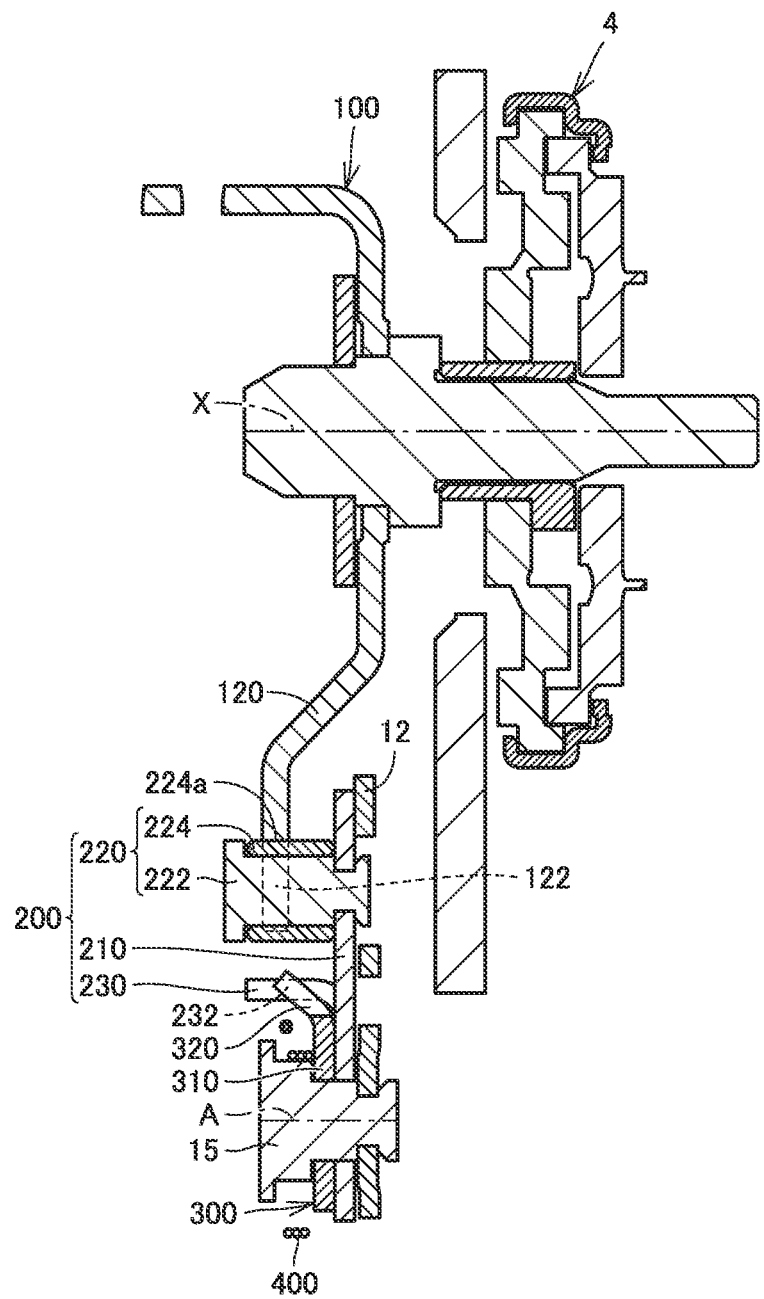
FIG. 3 is a cross-sectional view of the floor lock release mechanism.

FIG. 2 is a front view of the floor lock release mechanism. FIG. 3 is a cross-sectional view of the floor lock release mechanism.

A floor lock release mechanism 50 is a mechanism that can release floor lock 3. Floor lock release mechanism 50 operates in response to tilting of seat back 20 (pivoting of recliner 4) with respect to seat cushion 10. Floor lock release mechanism 50 includes an arm member 100, a lever 200, a switching member 300, a lever biasing member 400, and a switching member biasing member 500.

Arm member 100 rotates relative to cushion side frame 11 in the same direction as a direction of rotation of back side frame 21 with respect to cushion side frame 11 when back side frame 21 tilts with respect to cushion side frame 11. In the present embodiment, arm member 100 is connected to cushion side frame 11 so as to be rotatable relative to cushion side frame 11.

Arm member 100 includes an upper arm 110 and a lower arm 120.

Upper arm 110 engages with an upper arm 22 that constitutes a part of back side frame 21. Upper arm 110 is shaped to extend upward in a direction from a rotation center X of arm member 100 toward the front, when seat back 20 is in an ordinary posture (posture indicated by a solid line in FIG. 1).

Lower arm 120 is shaped to extend downward in the direction from rotation center X of arm member 100 toward the front, when seat back 20 is in the above-described ordinary posture. Lower arm 120 includes a contact portion 122 that comes into contact with lever 200. Contact portion 122 is constituted by a tip of lower arm 120.

Lever 200 is connected to cushion side frame 11 so as to rotate relative to cushion side frame 11 by being pushed by arm member 100 when arm member 100 rotates with respect to cushion side frame 11. By being pushed by arm member 100, lever 200 rotates around a rotation center A of lever 200 in a direction opposite to a direction of rotation of arm member 100.

Figure 7:
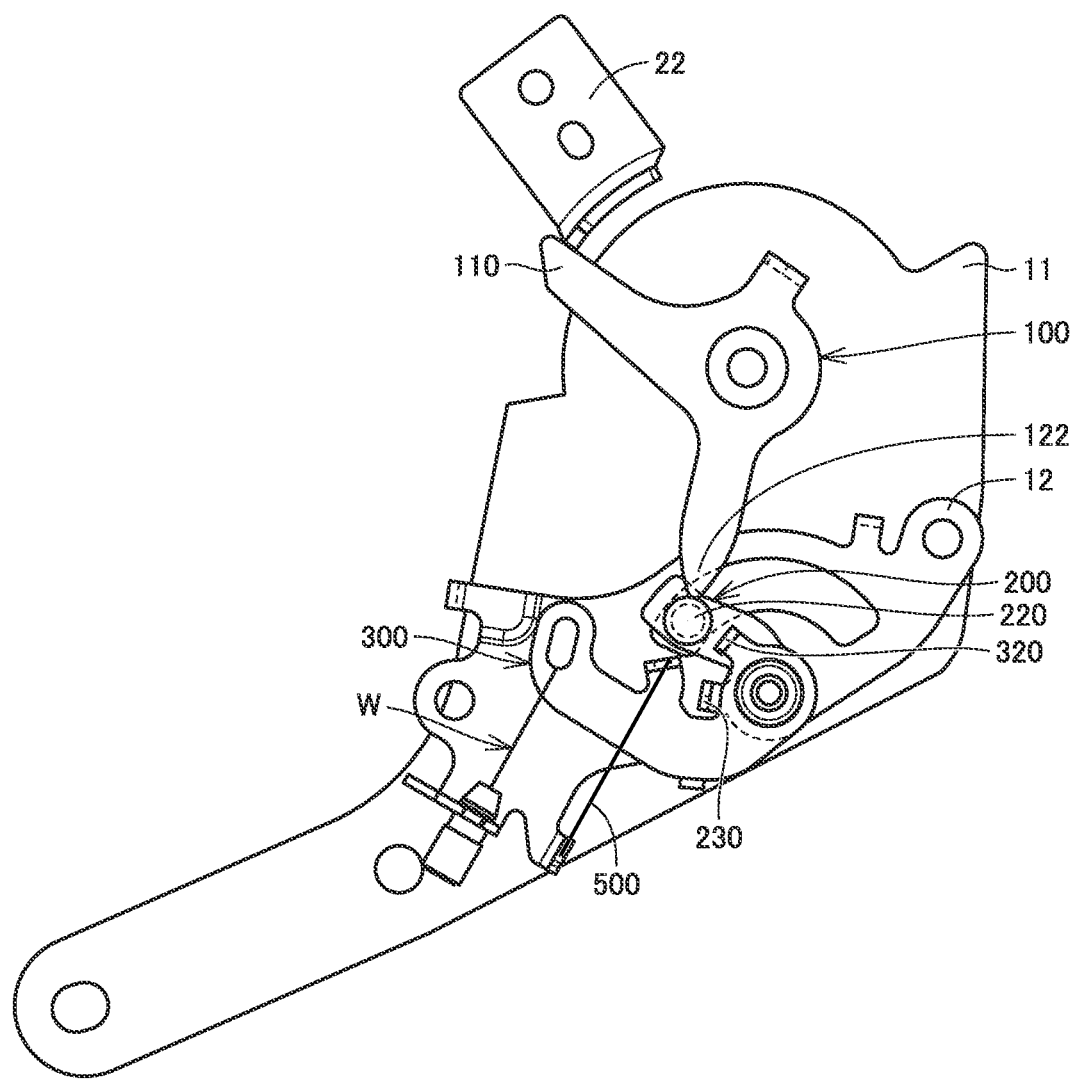
FIG. 7 is a front view of the floor lock release mechanism showing a state in which the arm member is pushing the lever in a forward rotational direction.
Figure 8:
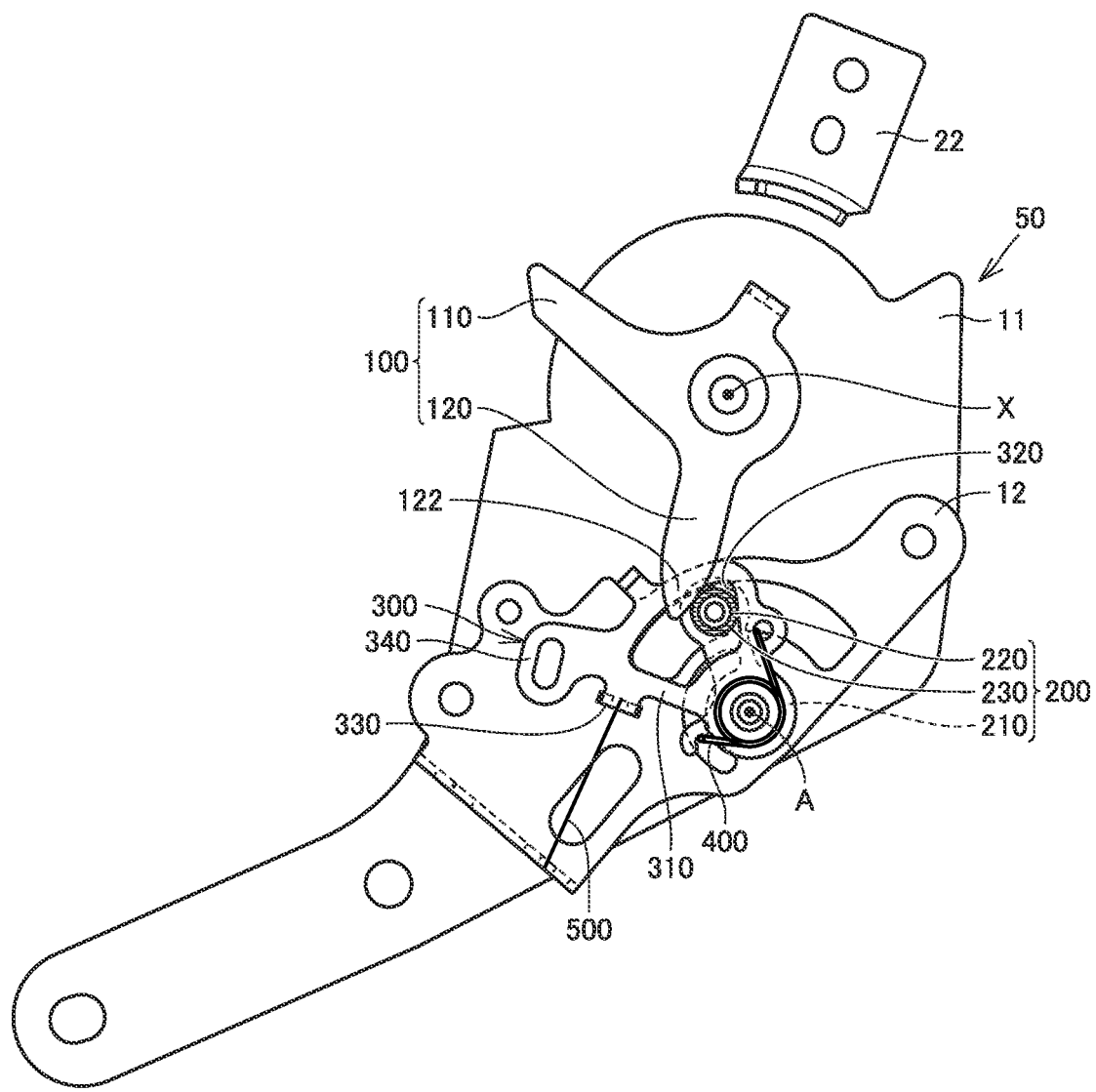
FIG. 8 is a front view of a floor lock release mechanism according to a second embodiment of the present disclosure.

Lever 200 is rotatable around rotation center A between a rearward rotational position (position shown in FIG. 5) and a forward rotational position (position shown in FIG. 7).

The rearward rotational position is a position in which lever 200 is rotated around rotation center A in a rearward rotational direction (clockwise direction in FIG. 2) opposite to a forward rotational direction (counterclockwise direction in FIG. 2) in which arm member 100 rotates when back side frame 21 tilts forward with respect to cushion side frame 11 from a neutral position (position shown in FIG. 1) in which no external force from arm member 100 acts on lever 200.

The forward rotational position is a position in which lever 200 is rotated around rotation center A in the forward rotational direction from the above-described neutral position.

Lever 200 rotates around rotation center A toward the rearward rotational position by being pushed by contact portion 122 of arm member 100 that rotates around rotation center X in the forward rotational direction. At this time, lever 200 pushes switching member 300 toward a below-described unlocked position. Lever 200 rotates around rotation center A toward the forward rotational position by being pushed by contact portion 122 of arm member 100 that rotates around rotation center X in the rearward rotational direction. At this time, lever 200 is separated from switching member 300.

As shown in FIGS. 2 and 3, lever 200 includes a lever main body 210, a protruding portion 220 and a cut-and-raised piece 230.

Lever main body 210 is connected to cushion side frame 11 so as to be rotatable around rotation center A relative to cushion side frame 11. Lever main body 210 is connected to a bracket 12 that constitutes a part of cushion side frame 11, by a pin 15 whose central axis is rotation center A. Lever main body 210 is formed to have a flat plate shape.

Protruding portion 220 protrudes from lever main body 210 in a direction parallel to an axial direction of rotation center A. Bracket 12 is provided with an opening 12*h* for avoiding interference between bracket 12 and protruding portion 220. Protruding portion 220 includes a support shaft 222 and a roller 224.

Support shaft 222 is shaped to extend from lever main body 210 in the direction parallel to the axial direction of rotation center A. In the present embodiment, support shaft 222 is formed of a member different from lever main body 210 and is fixed to lever main body 210 so as not to be rotatable relative to lever main body 210. Support shaft 222 may be made of the same material as that of lever main body 210 and formed integrally with lever main body 210.

Roller 224 is supported by support shaft 222 so as to be rotatable relative to support shaft 222. Roller 224 is formed to have a cylindrical shape. Roller 224 rotates relative to support shaft 222 by being pushed by contact portion 122 of arm member 100. As shown in FIG. 3, a portion of roller 224 pushed by arm member 100 constitutes a pressed portion 224*a*.

Cut-and-raised piece 230 is a portion cut and raised from lever main body 210. Cut-and-raised piece 230 is cut and raised from lever main body 210 in the same orientation as an orientation of protrusion of protruding portion 220 from lever main body 210. In the present embodiment, cut-and-raised piece 230 is orthogonal to lever main body 210. A distance between cut-and-raised piece 230 and rotation center A is smaller than a distance between roller 224 and rotation center A.

As shown in FIG. 3, cut-and-raised piece 230 includes a pressing portion 232. Pressing portion 232 is a portion that presses switching member 300. Pressing portion 232 is arranged on the same side as a side on which pressed portion 224*a* is arranged with respect to a straight line L (see FIG. 2) orthogonal to both the axial direction of rotation center A and a straight line connecting pressed portion 224*a* and rotation center A of lever 200.

Switching member 300 can switch floor lock 3 between the above-described locked state and the above-described unlocked state. Switching member 300 is connected to cushion side frame 11 so as to rotate relative to cushion side frame 11 by being pushed by lever 200 when lever 200 rotates with respect to cushion side frame 11. Switching member 300 is rotatable between the locked position (position shown in FIG. 2) and the unlocked position (position shown in FIG. 5).

The locked position is a position in which floor lock 3 is maintained in the locked state. The unlocked position is a position in which switching member 300 is in contact with lever 200 located in the rearward rotational position and floor lock 3 is maintained in the unlocked state.

Switching member 300 includes a switching member main body 310, an abutting portion 320, a support piece 330, and a wire support portion 340.

Switching member main body 310 is connected to cushion side frame 11 so as to be rotatable around rotation center A relative to cushion side frame 11. Switching member main body 310 is formed to have a flat plate shape.

Abutting portion 320 is connected to switching member main body 310. Abutting portion 320 abuts against pressing portion 232 when lever main body 210 rotates in the rearward rotational direction. In the present embodiment, abutting portion 320 is constituted by a cut-and-raised piece cut and raised from switching member main body 310. Abutting portion 320 is cut and raised from switching member main body 310 in the same orientation as an orientation of cutting and raising of cut-and-raised piece 230 from lever main body 210. As shown in FIG. 3, abutting portion 320 is shaped to extend in a direction that intersects both switching member main body 310 and cut-and-raised piece 230.

Support piece 330 is a portion that supports switching member biasing member 500. One end of switching member biasing member 500 is connected to support piece 330.

Wire support portion 340 is a portion that supports wire W. One end of wire W is connected to wire support portion 340.

Lever biasing member 400 biases lever 200 toward the neutral position. In the present embodiment, lever biasing member 400 is constituted by a torsion spring.

Switching member biasing member 500 biases switching member 300 toward the locked position. Switching member biasing member 500 couples support piece 330 to a support piece 13 of cushion side frame 11.

Next, the operation of floor lock release mechanism 50 associated with forward tilting and rearward tilting of seat back 20 will be described with reference to FIGS. 4 to 7. When seat back 20 is in the ordinary posture, floor lock 3 is maintained in the locked state.

When seat back 20 tilts forward with respect to seat cushion 10 from the ordinary posture, contact portion 122 of arm member 100 pushes rearward pressed portion 224*a* of roller 224. As a result, roller 224 rotates relative to support shaft 222, and in the meantime, lever 200 rotates around rotation center A in the rearward rotational direction toward the rearward rotational position. Since roller 224 rotates relative to support shaft 222, friction produced between arm member 100 and lever 200 is reduced.

Figure 4:
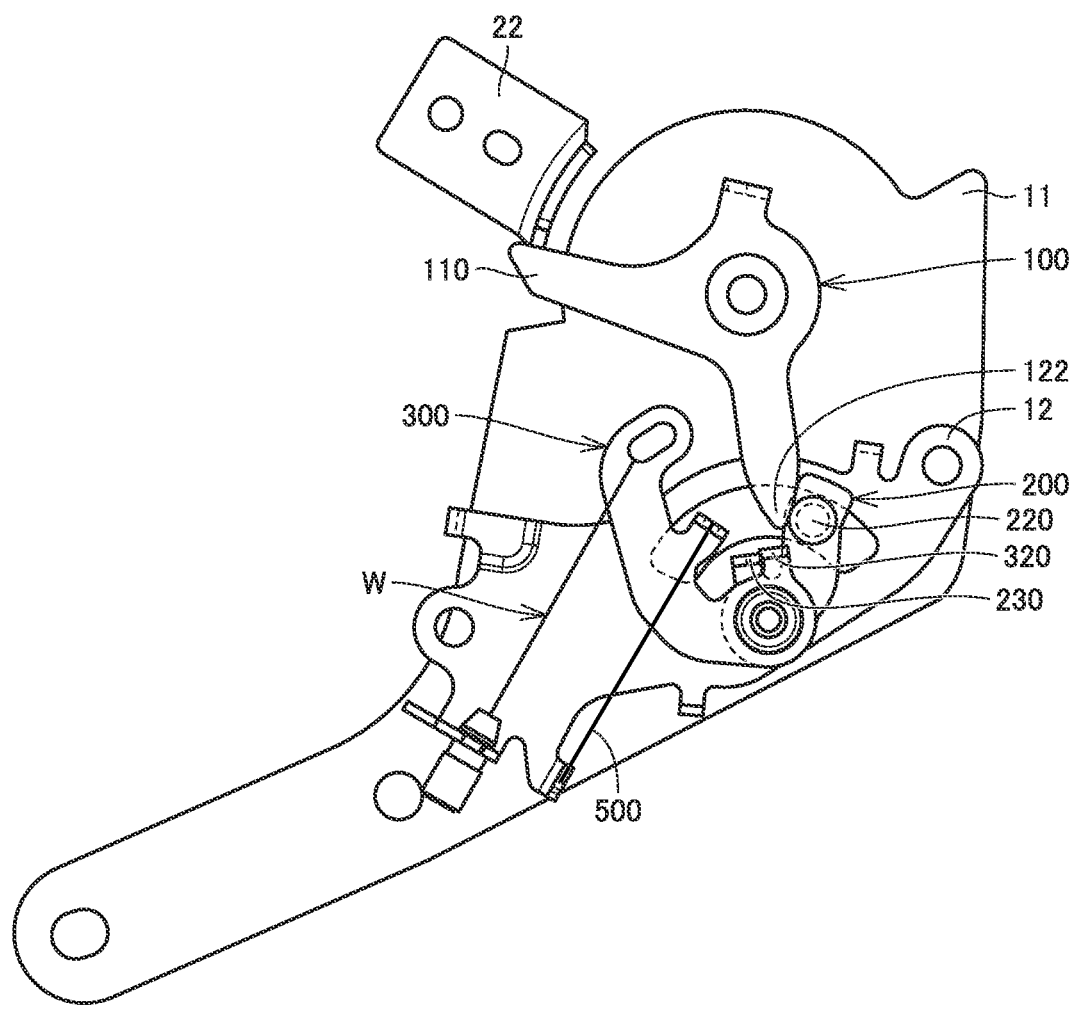
FIG. 4 is a front view of the floor lock release mechanism showing a state in which an arm member is pushing a lever toward a rearward rotational position.
Figure 5:
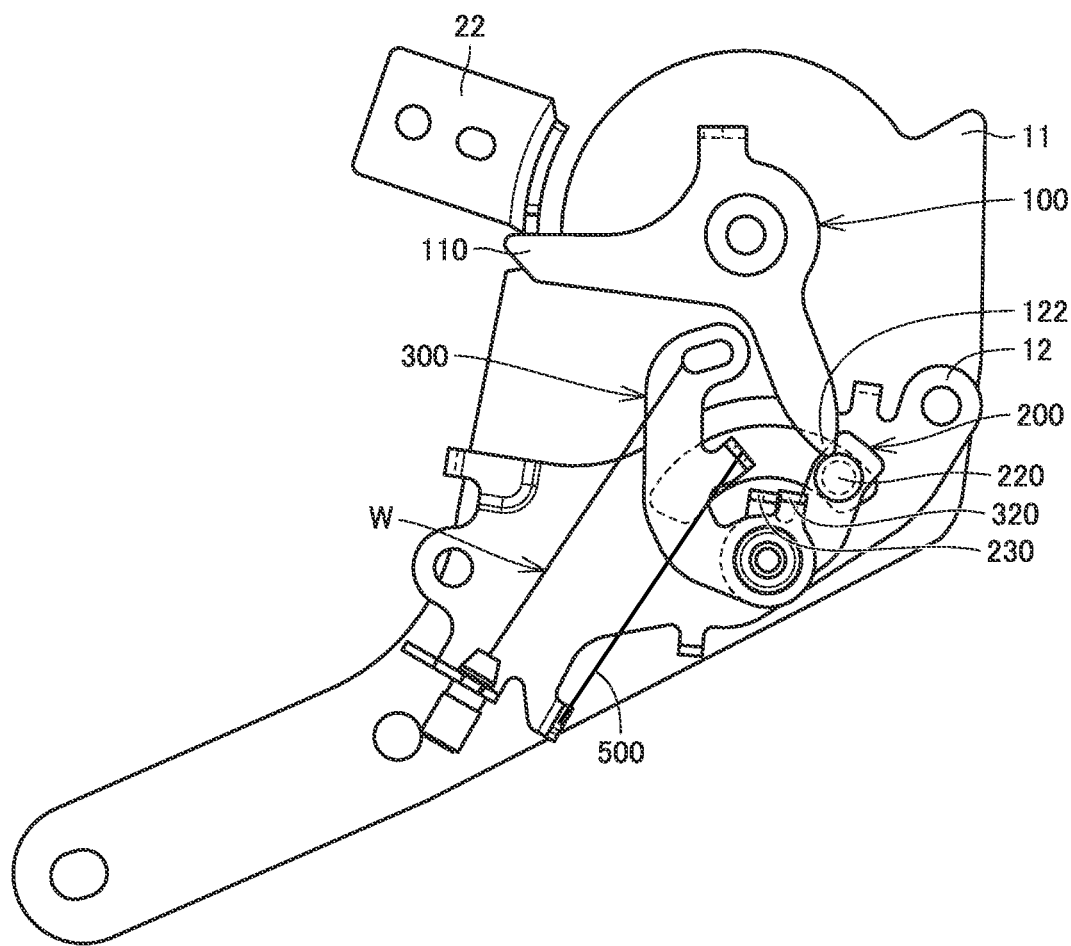
FIG. 5 is a front view of the floor lock release mechanism showing a state in which the arm member is pushing the lever toward the rearward rotational position.

When lever 200 rotates in the rearward rotational direction, pressing portion 232 that is a part of cut-and-raised piece 230 of lever 200 pushes abutting portion 320 of switching member 300 toward the unlocked position, as shown in FIGS. 4 and 5. As a result, switching member 300 rotates around rotation center A toward the unlocked position. Then, wire W is pulled, which brings floor lock 3 into the unlocked state.

Figure 6:
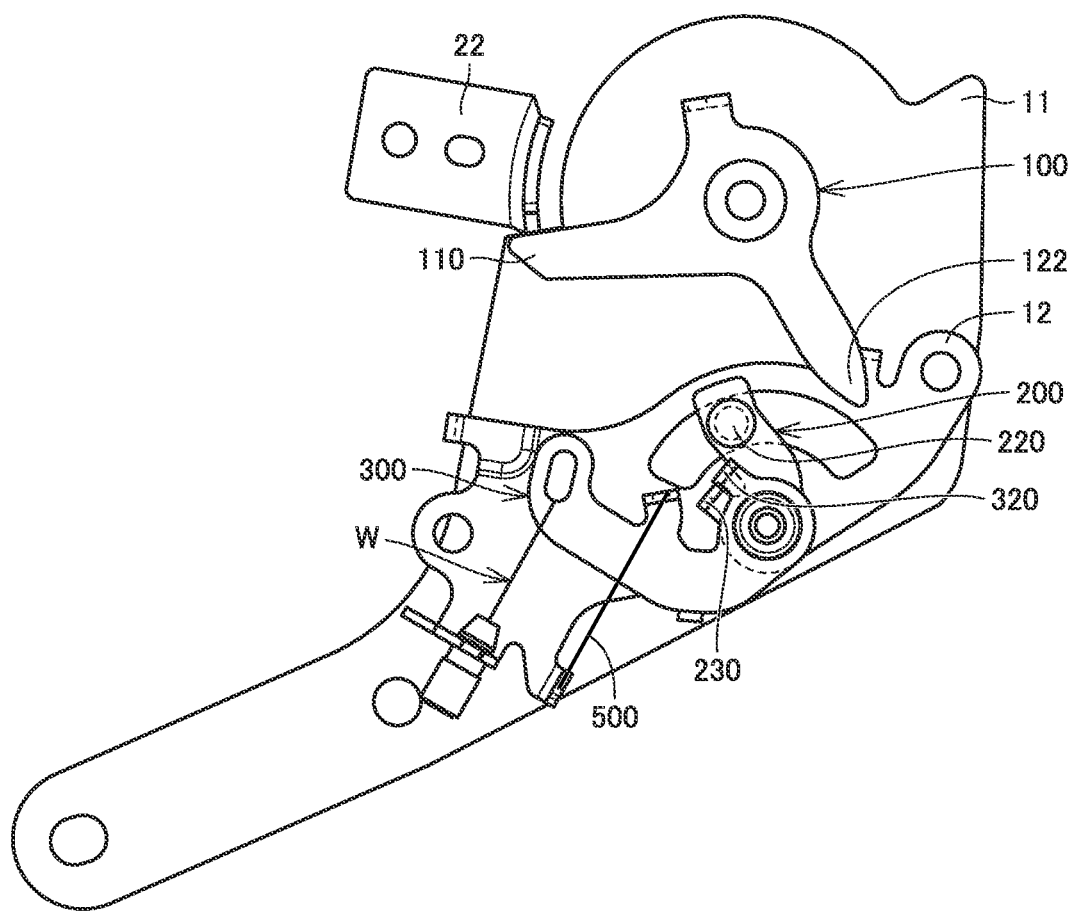
FIG. 6 is a front view of the floor lock release mechanism showing a state in which the pushing of the lever toward the rearward rotational position by the arm member has been released.

When seat back 20 further tilts forward from this state, contact portion 122 is separated from roller 224, as shown in FIG. 6. Then, due to biasing force (pulling force) of switching member biasing member 500, switching member 300 rotates around rotation center A in the forward rotational direction toward the locked position. When switching member 300 is located in the locked position, the pulling of wire W by switching member 300 is released, which brings floor lock 3 into the locked state.

When seat back 20 tilts rearward toward the ordinary posture from this state, contact portion 122 of arm member 100 pushes forward pressed portion 224*a* of roller 224, as shown in FIG. 7. As a result, roller 224 rotates relative to support shaft 222, and in the meantime, lever 200 rotates around rotation center A in the forward rotational direction toward the forward rotational position.

At this time, pressing portion 232 moves in a direction of separating from abutting portion 320 of switching member 300, and thus, floor lock 3 is maintained in the locked state.

As described above, in floor lock release mechanism 50 according to the present embodiment, pressing portion 232 of lever 200 is arranged on the same side as the side on which pressed portion 224a is arranged with respect to the straight line orthogonal to the straight line connecting pressed portion 224a and rotation center A of lever 200. Therefore, arm member 100 and lever 200 in a direction parallel to the straight line connecting pressed portion 224a and rotation center A of lever 200 are reduced in size.

In addition, abutting portion 320 is shaped to intersect cut-and-raised piece 230 including pressing portion 232. Therefore, abutting portion 320 is reduced in size, as compared with the case in which abutting portion 320 is orthogonal to pressing portion 232.

Second Embodiment

Next, floor lock release mechanism 50 according to a second embodiment of the present disclosure will be described with reference to FIGS. 8 to 13. In the second embodiment, the differences from the first embodiment will be only described and description of the same structure, function and effect as those of the first embodiment will not be repeated. Wire W is not shown in FIGS. 10 to 13.

Figure 9:
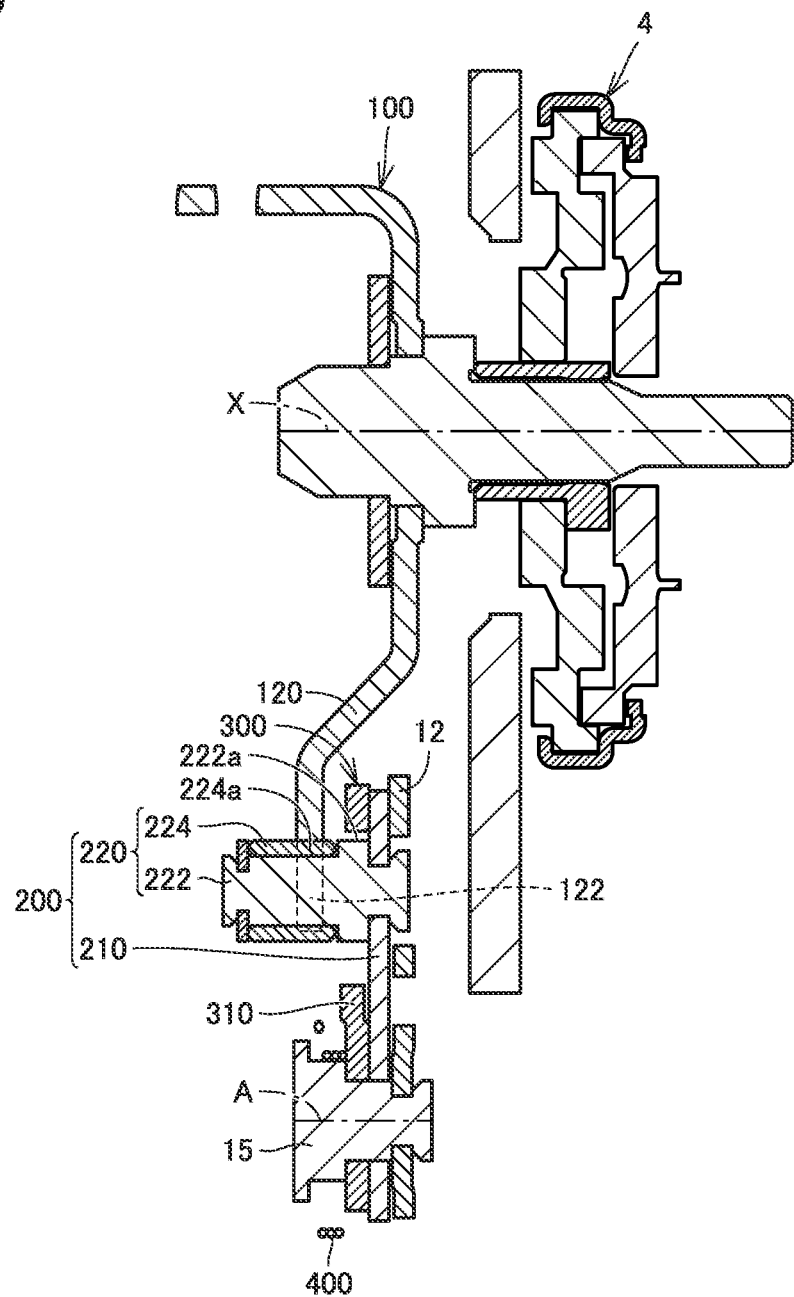
FIG. 9 is a cross-sectional view of the floor lock release mechanism shown in FIG. 8.
Figure 10:
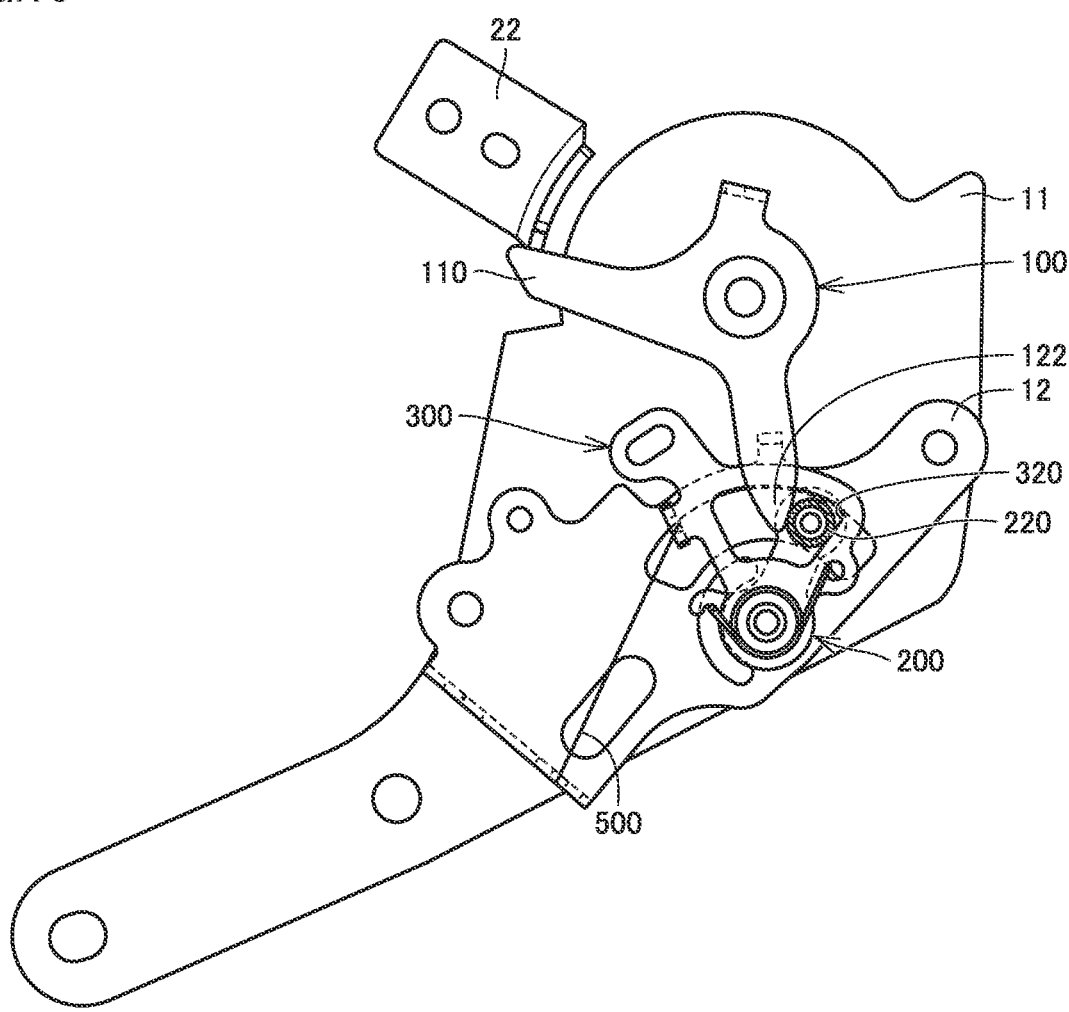
FIG. 10 is a front view of the floor lock release mechanism showing a state in which an arm member is pushing a lever toward a rearward rotational position.
Figure 11:
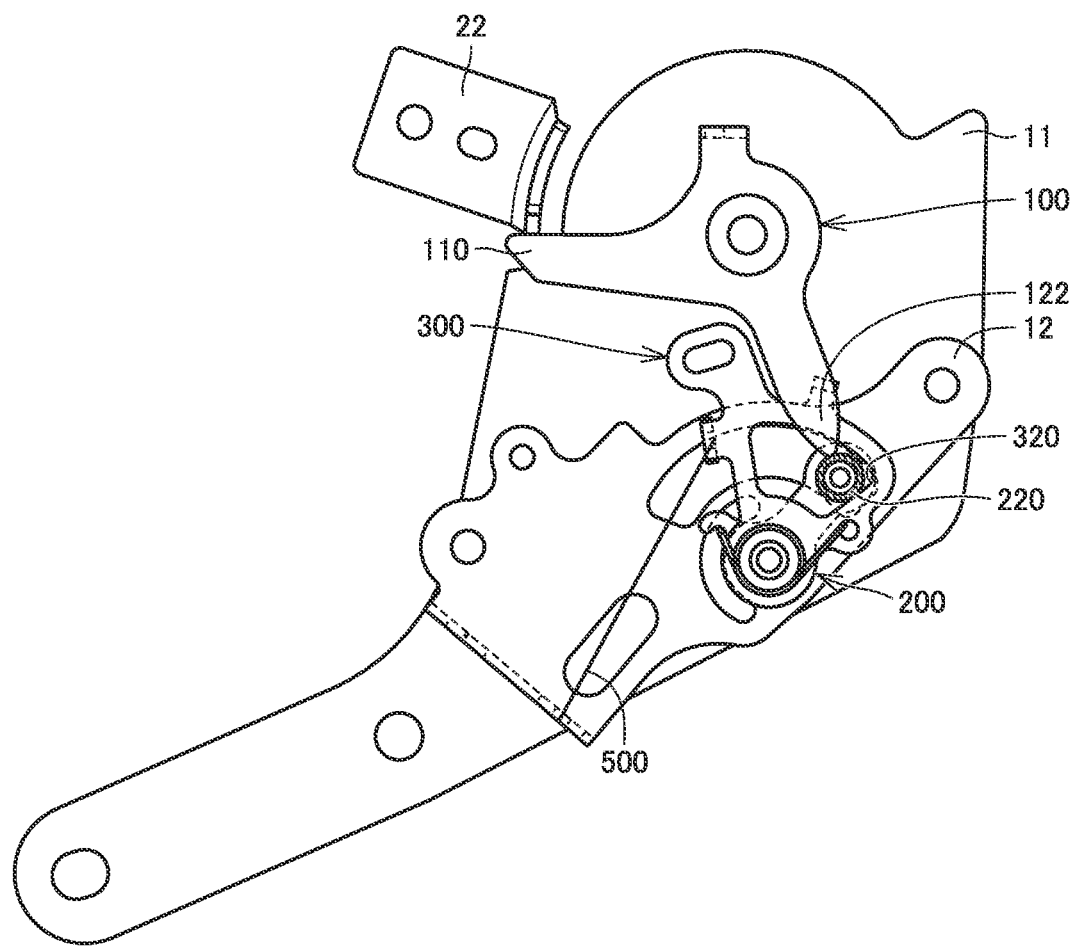
FIG. 11 is a front view of the floor lock release mechanism showing a state in which the arm member is pushing the lever toward the rearward rotational position.
Figure 12:
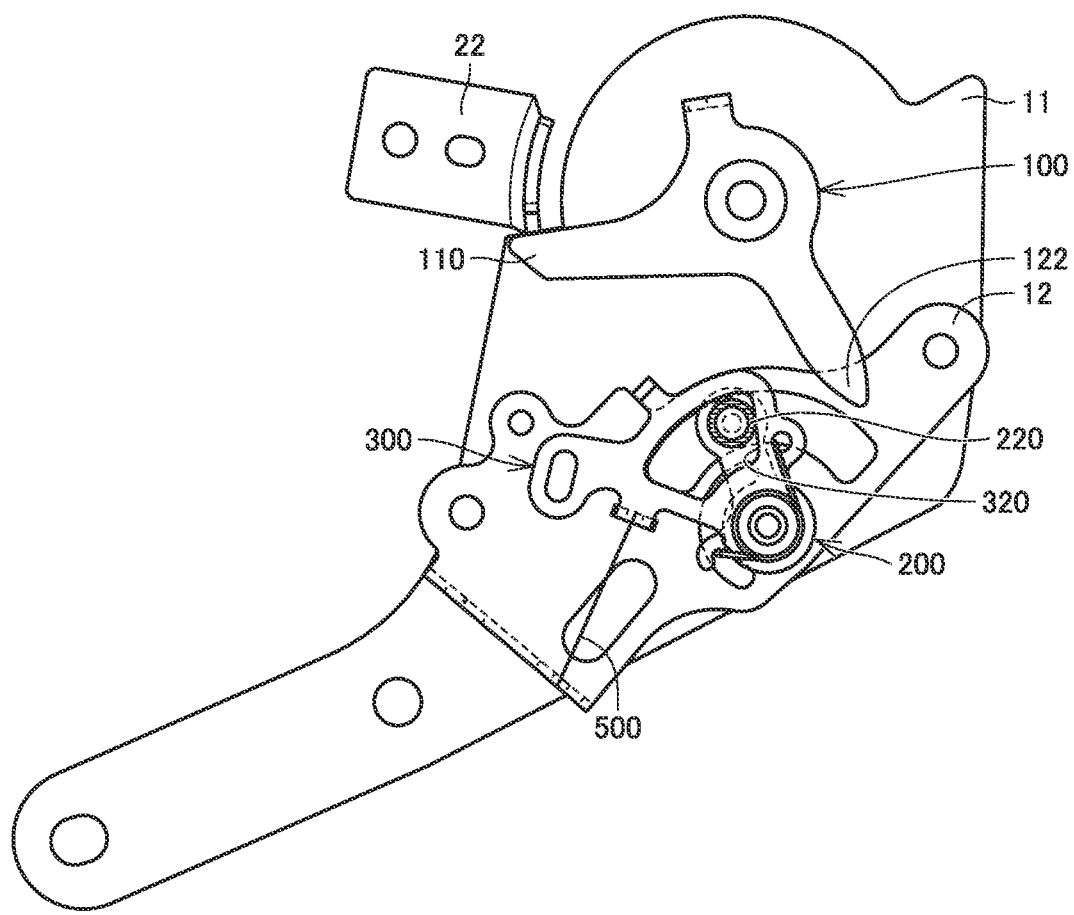
FIG. 12 is a front view of the floor lock release mechanism showing a state in which the pushing of the lever toward the rearward rotational position by the arm member has been released.
Figure 13:
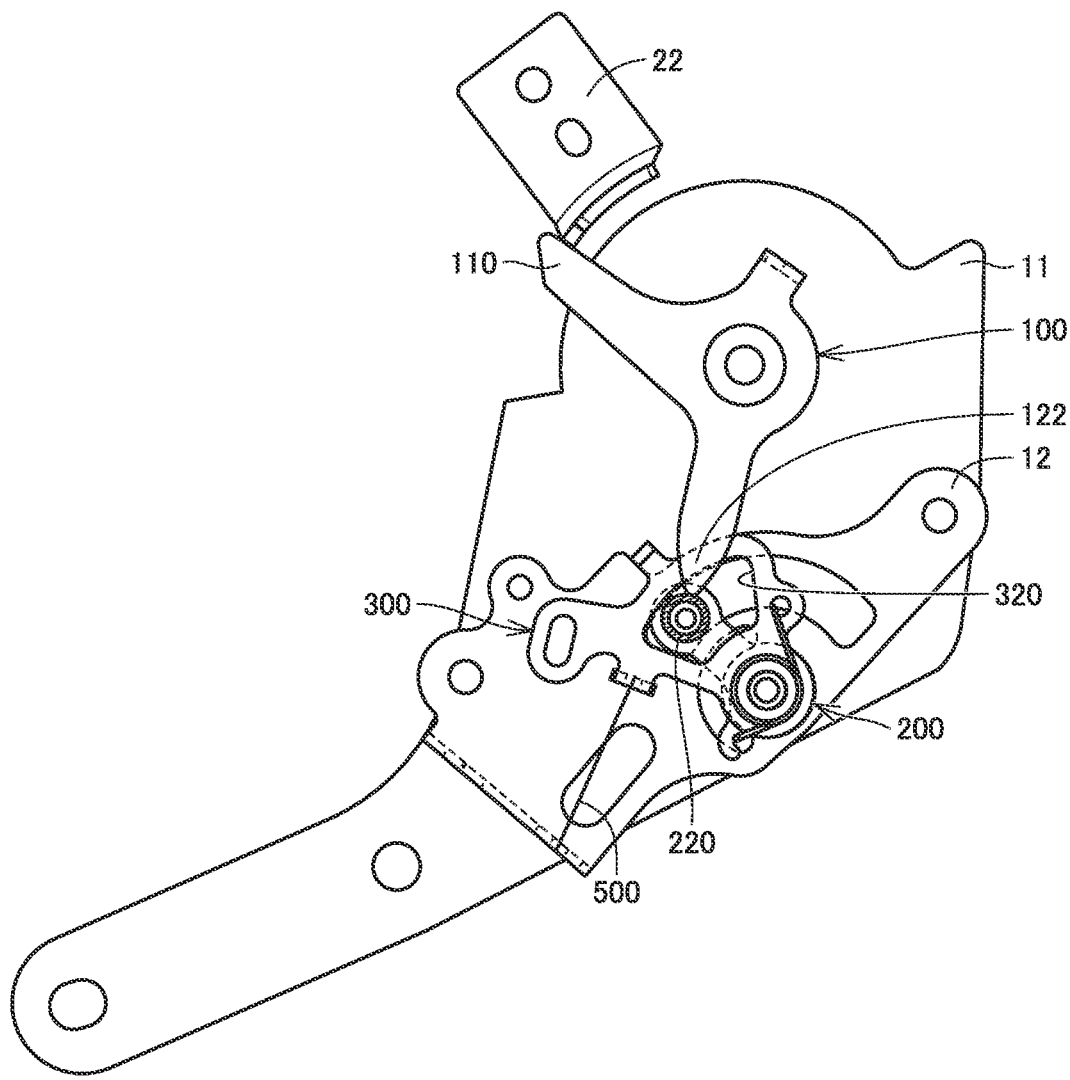
FIG. 13 is a front view of the floor lock release mechanism showing a state in which the arm member is pushing the lever in a forward rotational direction.

In the present embodiment, lever 200 includes lever main body 210 and protruding portion 220, and protruding portion 220 includes both pressed portion 224a and a pressing portion 222a. Specifically, support shaft 222 includes pressing portion 222a. As shown in FIG. 9, pressing portion 222a is constituted by a base end of support shaft 222. Similarly to the first embodiment, pressed portion 224a is constituted by a part of roller 224.

Figure 14:
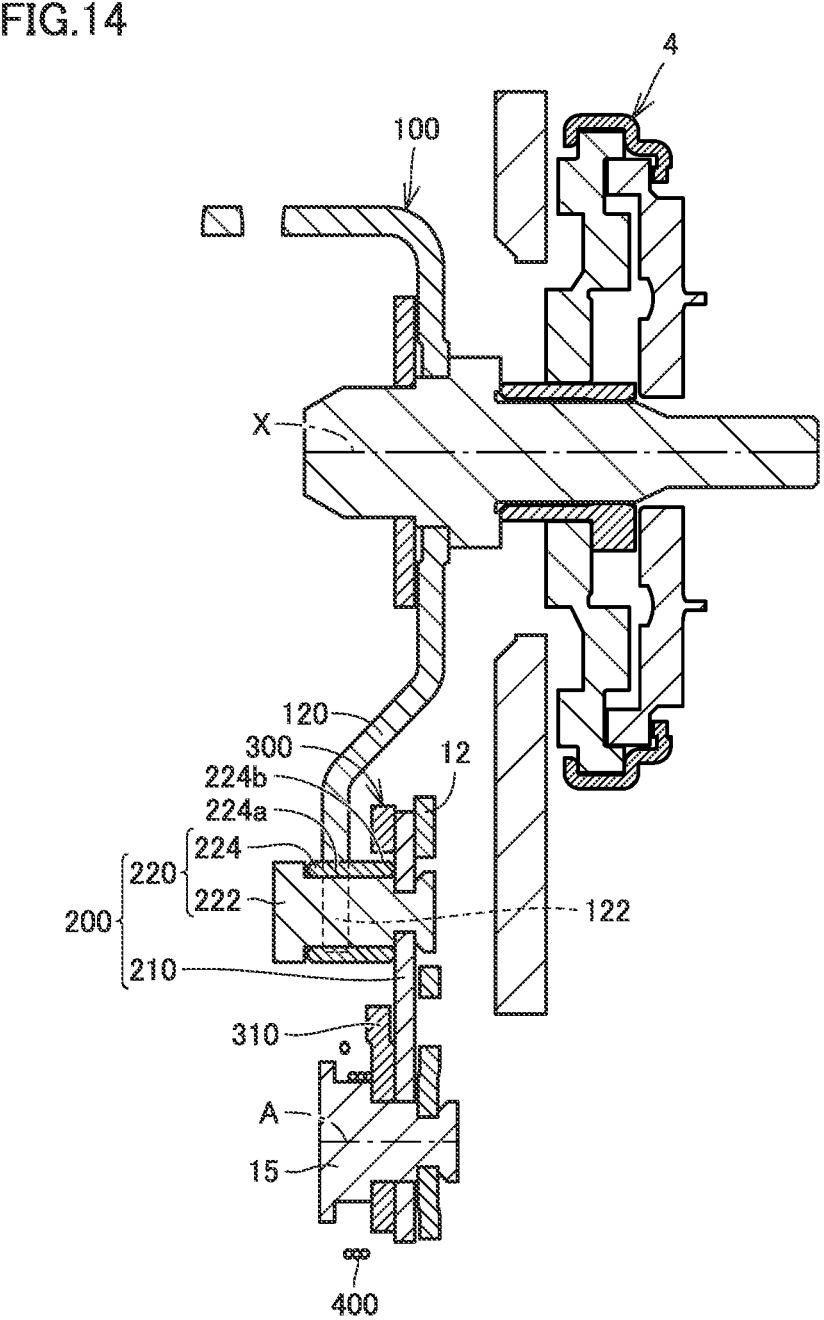
FIG. 14 is a cross-sectional view showing a modification of the floor lock release mechanism according to the second embodiment.

As shown in FIG. 14, roller 224 may include both pressed portion 224a and a pressing portion 224b. In this case, pressing portion 224b is constituted by a base end of roller 224. In addition, support shaft 222 and roller 224 may be made of the same material and formed integrally. In this case, however, friction is produced between arm member 100 and lever 200 when arm member 100 rotates in the forward rotational direction. Therefore, it is preferable that roller 224 is separated from switching member 300 as in each of the above-described embodiments.

Third Embodiment

Figure 15:
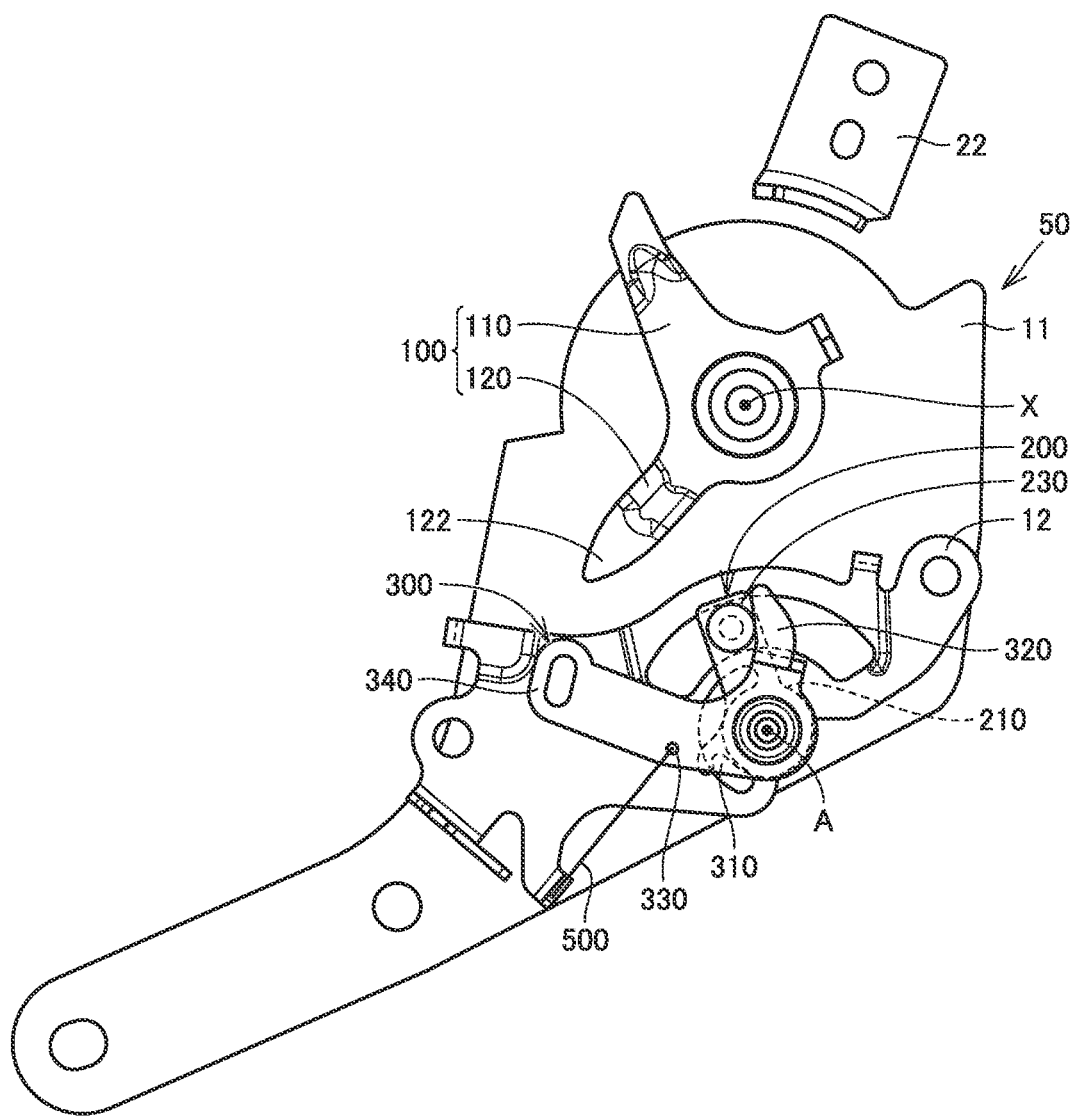
FIG. 15 is a front view of a floor lock release mechanism according to a third embodiment of the present disclosure.
Figure 16:
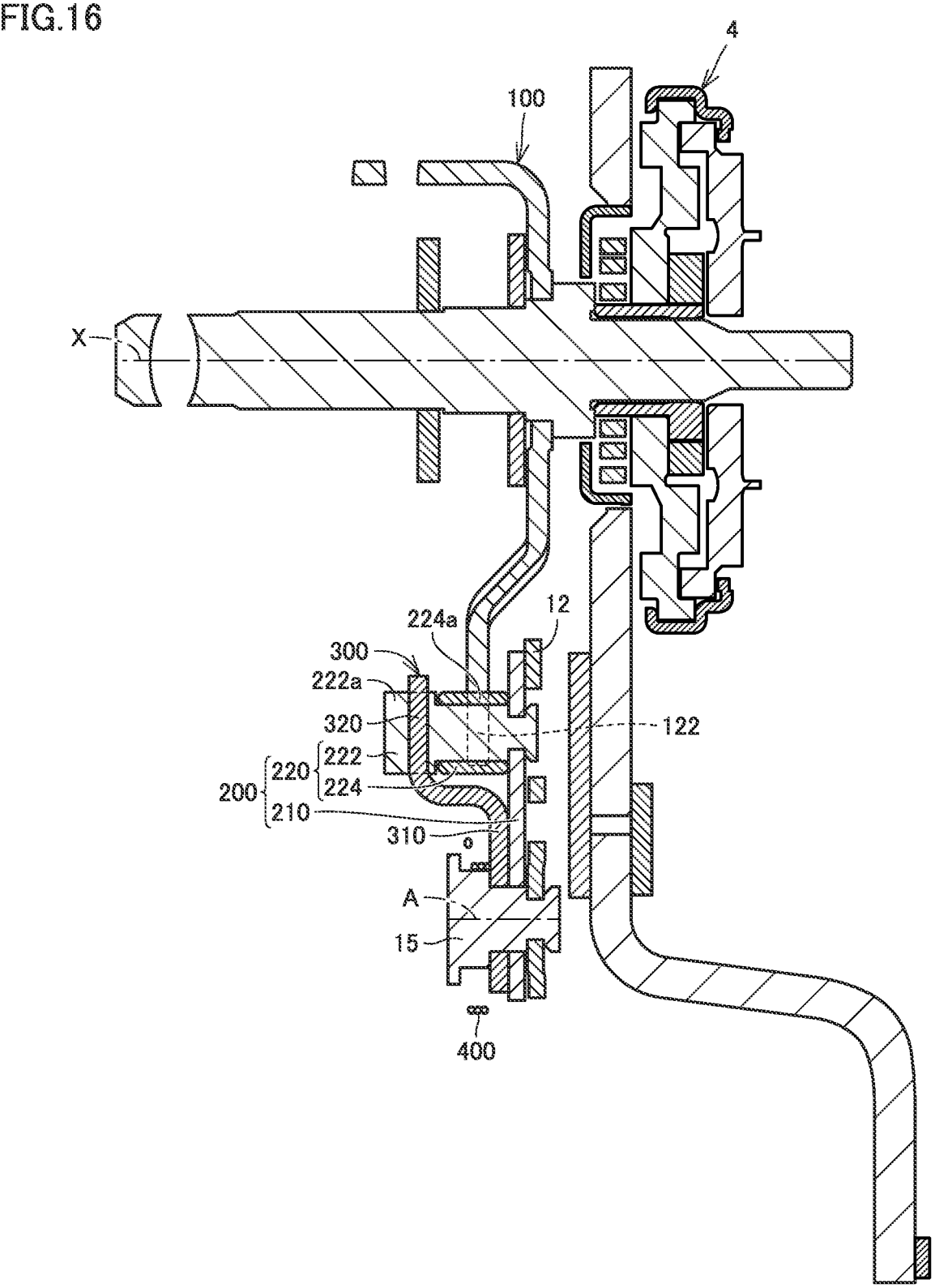
FIG. 16 is a cross-sectional view of the floor lock release mechanism shown in FIG. 15.

Next, floor lock release mechanism 50 according to a third embodiment of the present disclosure will be described with reference to FIGS. 15 and 16. In the third embodiment, the differences from the second embodiment will be only described and description of the same structure, function and effect as those of the second embodiment will not be repeated.

In the present embodiment, pressing portion 222a is constituted by a tip of support shaft 222. Abutting portion 320 of switching member 300 is formed by bending switching member main body 310. Abutting portion 320 is formed in a position separated from switching member main body 310 in the same orientation as an orientation of protrusion of protruding portion 220 from lever main body 210, and is orthogonal to a central axis of support shaft 222.

The above-described exemplary embodiments are understood as specific examples of the following by those skilled in the art.

A floor lock release mechanism according to one aspect of the present disclosure is a floor lock release mechanism that can release a floor lock that locks a movement of a seat with respect to a floor of a vehicle, the seat including a seat cushion and a seat back, the floor lock release mechanism comprising: an arm member that rotates relative to a cushion side frame in the same direction as a direction of rotation of a back side frame with respect to the cushion side frame when the back side frame tilts with respect to the cushion side frame, the cushion side frame constituting a part of a framework of the seat cushion, the back side frame constituting a part of a framework of the seat back; a lever connected to the cushion side frame so as to rotate relative to the cushion side frame by being pushed by the arm member when the arm member rotates with respect to the cushion side frame; a switching member connected to the cushion side frame so as to rotate relative to the cushion side frame by being pushed by the lever when the lever rotates with respect to the cushion side frame, and being capable of switching the floor lock between a locked state and an unlocked state, the locked state being a state in which the floor lock locks the movement of the seat with respect to the floor, the unlocked state being a state in which the floor lock permits the movement of the seat with respect to the floor; a lever biasing member that biases the lever; and a switching member biasing member that biases the switching member, wherein the lever is rotatable between a rearward rotational position and a forward rotational position, the rearward rotational position being a position in which the lever is rotated in a rearward rotational direction opposite to a forward rotational direction in which the arm member rotates when the back side frame tilts forward with respect to the cushion side frame from a neutral position in which no external force from the arm member acts on the lever, the forward rotational position being a position in which the lever is rotated in the forward rotational direction from the neutral position, the lever biasing member biases the lever toward the neutral position, the switching member is rotatable between a locked position and an unlocked position, the locked position being a position in which the floor lock is maintained in the locked state, the unlocked position being a position in which the switching member is in contact with the lever located in the rearward rotational position and the floor lock is maintained in the unlocked state, the switching member biasing member biases the switching member toward the locked position, the lever pushes the switching member toward the unlocked position while rotating toward the rearward rotational position by being pushed by the arm member that rotates in the forward rotational direction, and rotates toward the forward rotational position while being separated from the switching member by being pushed by the arm member that rotates in the rearward rotational direction, the lever includes: a pressed portion that is pressed by the arm member; and a pressing portion that presses the switching member, and the pressing portion is arranged on the same side as a side on which the pressed portion is arranged with respect to a straight line orthogonal to a straight line connecting the pressed portion and a rotation center of the lever.

In the floor lock release mechanism, the pressing portion of the lever is arranged on the same side as the side on which the pressed portion is arranged with respect to the straight line orthogonal to the straight line connecting the pressed portion and the rotation center of the lever. Therefore, the arm member and the lever in a direction parallel to the straight line connecting the pressed portion and the rotation center of the lever are reduced in size.

The lever may include: a lever main body connected to the cushion side frame so as to be rotatable around the rotation center relative to the cushion side frame; a protruding portion protruding from the lever main body in a direction parallel to an axial direction of the rotation center; and a cut-and-raised piece cut and raised from the lever main body, and the cut-and-raised piece may include the pressing portion.

According to the foregoing, the number of components is reduced, as compared with the case in which the lever main body and the pressing portion are formed of different members.

The switching member may include: a switching member main body connected to the cushion side frame so as to be rotatable around the rotation center relative to the cushion side frame; and an abutting portion connected to the switching member main body and abutting against the pressing portion when the lever main body rotates in the rearward rotational direction.

In this case, it is preferable that the abutting portion is constituted by a cut-and-raised piece cut and raised from the switching member main body, and the abutting portion is shaped to intersect the pressing portion.

According to the foregoing, a reduction in size of the abutting portion can be achieved, as compared with the case in which the abutting portion is orthogonal to the pressing portion.

The lever may include: a lever main body connected to the cushion side frame so as to be rotatable around the rotation center relative to the cushion side frame; and a protruding portion protruding from the lever main body in a direction parallel to an axial direction of the rotation center, and the protruding portion may include the pressed portion and the pressing portion.

According to the foregoing, the protruding portion includes the pressed portion and the pressing portion, and thus, the number of components is reduced.

The protruding portion may include: a support shaft shaped to extend from the lever main body in the direction parallel to the axial direction of the rotation center; and a roller supported by the support shaft so as to be rotatable relative to the support shaft. In this case, it is preferable that the roller includes the pressed portion, and the support shaft includes the pressing portion.

According to the foregoing, when the arm member presses the pressed portion during rotation of the arm member in the forward rotational direction, the pressing portion of the support shaft presses the switching member while the roller rotates relative to the support shaft. Therefore, friction produced between the arm member and the lever is reduced.

It should be understood that the embodiments disclosed herein are illustrative and non-restrictive in every respect. The scope of the present disclosure is defined by the terms of the claims, rather than the description of the embodiments above, and is intended to include any modifications within the scope and meaning equivalent to the terms of the claims.

What is claimed is:

1. A floor lock release mechanism that can release a floor lock that locks a movement of a seat with respect to a floor of a vehicle, the seat including a seat cushion and a seat back, the floor lock release mechanism comprising:
an arm member that rotates relative to a cushion side frame in the same direction as a direction of rotation of a back side frame with respect to the cushion side frame when the back side frame tilts with respect to the cushion side frame, the cushion side frame constituting a part of a framework of the seat cushion, the back side frame constituting a part of a framework of the seat back;
a lever connected to the cushion side frame so as to rotate relative to the cushion side frame by being pushed by the arm member when the arm member rotates with respect to the cushion side frame;
a switching member connected to the cushion side frame so as to rotate relative to the cushion side frame by being pushed by the lever when the lever rotates with respect to the cushion side frame, and being capable of switching the floor lock between a locked state and an unlocked state, the locked state being a state in which the floor lock locks the movement of the seat with respect to the floor, the unlocked state being a state in which the floor lock permits the movement of the seat with respect to the floor;
a lever biasing member that biases the lever; and
a switching member biasing member that biases the switching member, wherein
the lever is rotatable between a rearward rotational position and a forward rotational position, the rearward rotational position being a position in which the lever is rotated in a rearward rotational direction opposite to a forward rotational direction in which the arm member rotates when the back side frame tilts forward with respect to the cushion side frame from a neutral position in which no external force from the arm member acts on the lever, the forward rotational position being a position in which the lever is rotated in the forward rotational direction from the neutral position,
the lever biasing member biases the lever toward the neutral position,
the switching member is rotatable between a locked position and an unlocked position, the locked position being a position in which the floor lock is maintained in the locked state, the unlocked position being a position in which the switching member is in contact with the lever located in the rearward rotational position and the floor lock is maintained in the unlocked state,
the switching member biasing member biases the switching member toward the locked position,
the lever pushes the switching member toward the unlocked position while rotating toward the rearward rotational position by being pushed by the arm member that rotates in the forward rotational direction, and rotates toward the forward rotational position while being separated from the switching member by being pushed by the arm member that rotates in the rearward rotational direction,
the lever includes:
a pressed portion that is pressed by the arm member; and
a pressing portion that presses the switching member, and
the pressing portion is arranged on the same side as a side on which the pressed portion is arranged with respect to a straight line orthogonal to a straight line connecting the pressed portion and a rotation center of the lever.

2. The floor lock release mechanism according to claim 1, wherein
the lever includes:
a lever main body connected to the cushion side frame so as to be rotatable around the rotation center relative to the cushion side frame;
a protruding portion protruding from the lever main body in a direction parallel to an axial direction of the rotation center; and
a cut-and-raised piece cut and raised from the lever main body, and
the cut-and-raised piece includes the pressing portion.

3. The floor lock release mechanism according to claim 2, wherein
the switching member includes:
a switching member main body connected to the cushion side frame so as to be rotatable around the rotation center relative to the cushion side frame; and
an abutting portion connected to the switching member main body and abutting against the pressing portion when the lever main body rotates in the rearward rotational direction.

4. The floor lock release mechanism according to claim 3, wherein
the abutting portion is constituted by a cut-and-raised piece cut and raised from the switching member main body, and
the abutting portion is shaped to intersect the pressing portion.

5. The floor lock release mechanism according to claim 1, wherein
the lever includes:
a lever main body connected to the cushion side frame so as to be rotatable around the rotation center relative to the cushion side frame; and
a protruding portion protruding from the lever main body in a direction parallel to an axial direction of the rotation center, and
the protruding portion includes the pressed portion and the pressing portion.

6. The floor lock release mechanism according to claim 5, wherein
the protruding portion includes:
a support shaft shaped to extend from the lever main body in the direction parallel to the axial direction of the rotation center; and
a roller supported by the support shaft so as to be rotatable relative to the support shaft,
the roller includes the pressed portion, and
the support shaft includes the pressing portion.

* * * * *